United States Patent
Nahill et al.

(10) Patent No.: US 6,977,104 B1
(45) Date of Patent: *Dec. 20, 2005

(54) CONTAINER PREFORM ASSEMBLY AND METHOD OF MANUFACTURE

(75) Inventors: Thomas E. Nahill, Amherst, NH (US); Brian A. Lynch, Merrimack, NH (US); Jeffrey D. DiPasquale, Maumee, OH (US)

(73) Assignee: Graham Packaging PET Technologies Inc., York, PA (US)

( * ) Notice: Subject to any disclaimer, the term of this patent is extended or adjusted under 35 U.S.C. 154(b) by 42 days.

This patent is subject to a terminal disclaimer.

(21) Appl. No.: 10/403,415

(22) Filed: Mar. 28, 2003

(51) Int. Cl.[7] .............................. B32B 1/08; B65D 1/02; B65D 1/46; B65B 7/28
(52) U.S. Cl. .................... 428/35.7; 215/40; 215/42; 215/43; 215/44
(58) Field of Search .................. 428/35.7; 215/40, 215/42, 43, 44

(56) References Cited

U.S. PATENT DOCUMENTS

| | | | |
|---|---|---|---|
| 3,124,273 A | 3/1964 | Remington | 222/92 |
| 3,603,472 A | 9/1971 | Lecinski | 215/253 |
| 3,899,096 A | 8/1975 | Marco | 215/42 |
| 4,293,520 A | 10/1981 | Akutsu | 264/513 |
| 4,341,317 A | 7/1982 | Suzuki | 215/42 |
| 4,607,757 A | 8/1986 | Lecinski | 215/246 |
| 5,588,544 A * | 12/1996 | Takashima et al. | 215/42 |
| 5,833,085 A | 11/1998 | Valyi | 215/44 |
| 5,884,786 A | 3/1999 | Valyi | 215/44 |
| 6,076,688 A * | 6/2000 | Forget | 215/44 |
| 6,105,800 A * | 8/2000 | Czesak | 215/42 |
| 6,811,845 B2 * | 11/2004 | Nahill et al. | 428/35.7 |

* cited by examiner

*Primary Examiner*—Steven P. Griffin
*Assistant Examiner*—Chris Bruenjes
(74) *Attorney, Agent, or Firm*—Kudirka & Jobse, LLP

(57) ABSTRACT

A preform assembly for blow molding a container includes a molded plastic preform having a body and a neck with an external surface. At least one circumferential channel is molded into the external surface of the preform neck for removing the preform from the forming mold. A plastic finish ring separate from the preform is externally secured to the preform neck over the external surface of the neck.

6 Claims, 2 Drawing Sheets

CONTAINER PREFORM ASSEMBLY AND METHOD OF MANUFACTURE

The present invention is directed to preforms for blow molding plastic containers, and to methods of making such preforms.

BACKGROUND AND SUMMARY OF THE INVENTION

In the manufacture of plastic containers, it is conventional to injection mold or compression mold a container preform having a body and a finish with one or more external threads. The finish typically is molded to its final geometry, while the body of the preform is subsequently blow molded to the desired geometry of the container body. The preform may be of monolayer construction, or may be of multilayer construction in which one or more intermediate layers in the preform body may or may not extend into the finish area of the preform. U.S. Pat. Nos. 4,609,516, 4,710,118 and 4,954,376 illustrate injection molding of multilayer container preforms.

Molding the finish portion of the container as part of the preform presents a number of problems. For example, when the preforms are formed by injection molding, the plastic material typically is injected into a mold cavity at the closed end of the preform body, so that the material must flow along the sides of the preform cavity into the area in which the finish is molded. The finish typically requires more accurate and stable dimensioning than the body of the preform, which may limit the cycle time of the molding process. Furthermore, the finish portion of the preform is of the same material as at least the outer layers of the preform body, which limits the ability to obtain the most desirable characteristics at the finish. When the preform is of polyester construction, such as polyethylene terephthalate (PET), the finish portion of the preform can be wholly or partially crystallized to improve the operating characteristics of the finish area, particularly in hot-fill container applications. However, the requirement that the finish be of the same material as at least the outer layers of the preform body still limits the design capabilities of preform manufacture.

A preform assembly for blow molding a container in accordance with a first aspect of the present invention includes a molded plastic preform having a body and a neck with an external surface. At least one circumferential channel is molded into the external surface of the preform neck for removing the preform from the forming mold. A plastic finish ring separate from the preform is externally secured to the preform neck over the external surface of the neck. A method of making a preform assembly for blow molding a container in accordance with a second aspect of the invention includes molding a preform having a body and a cylindrical neck with an external surface, and at least one circumferential channel molded into the external surface of the neck. A plastic finish ring is secured over the external surface of the cylindrical neck.

BRIEF DESCRIPTION OF THE DRAWINGS

The invention, together with additional objects, features, advantages and aspects thereof, will be best understood from the following description, the appended claims and the accompanying drawings, in which:

DETAILED DESCRIPTION OF PREFERRED EMBODIMENTS

Figure 1:
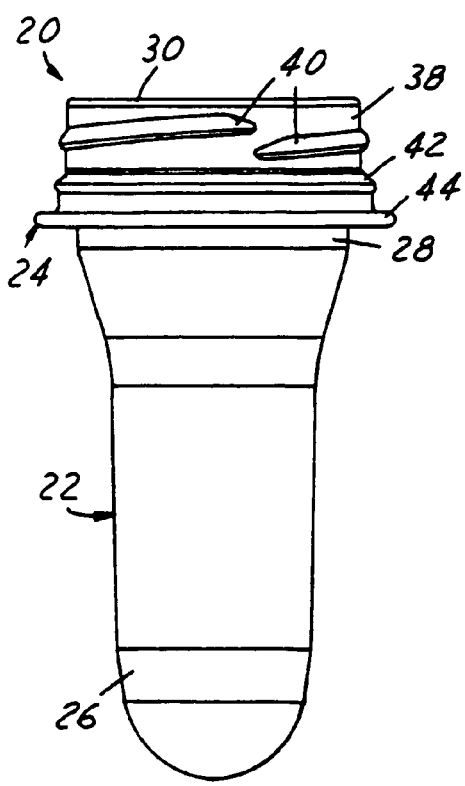
FIG. 1 is an elevational view of a preform assembly in accordance with one exemplary presently preferred embodiment of the invention.
Figure 2:
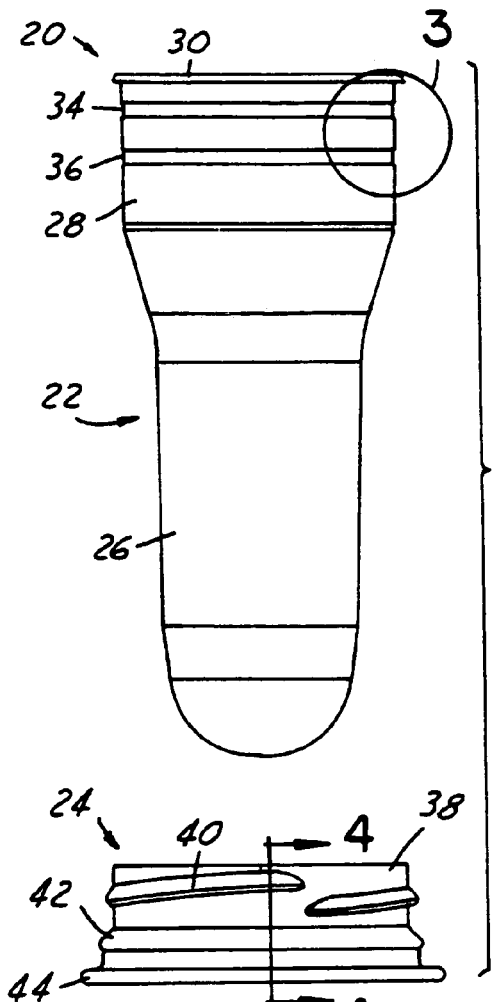
FIG. 2 is an exploded elevational view of the preform assembly illustrated in FIG. 1.
Figure 3:
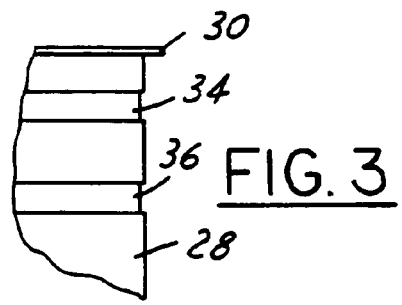
FIG. 3 is a fragmentary elevational view on an enlarged scale of the portion of FIG. 2 within the area 3.
Figure 4:
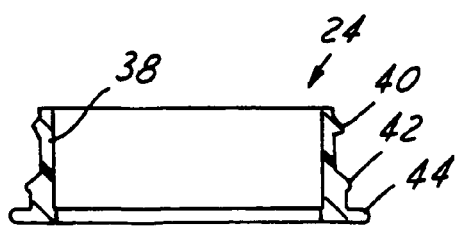
FIG. 4 is a sectional view of the finish ring in the preform assembly of FIGS. 1 and 2, being taken substantially along the line 4—4 in FIG. 2.

FIGS. 1–5 illustrate a preform assembly 20 in accordance with one presently preferred embodiment of the invention as comprising a preform 22 and a separate finish ring 24 secured over the neck of preform 22. Preform 22 includes a body 26 having a closed lower end, and a neck 28 integrally molded with body 26. (Directional words such as "upper" and "lower" are employed by way of description and not limitation with respect to the upright orientation of the preform assemblies and components illustrated in the drawings. Directional words such as "radial" and "circumferential" are employed by way of description and not limitation with respect to the axis of the preform neck or finish ring as appropriate.) Neck 28 typically is cylindrical. A flange 30 extends radially outward from the open end of neck 28 remote from body 26. Neck 28 and flange 30 surround the open mouth of preform 22. A pair of axially spaced circumferential channels 34, 36 extend around the outer surface of neck 28, which preferably is cylindrical in geometry. In the embodiment of FIGS. 1–5, channels 34, 36 are in planes that are parallel to each other and perpendicular to the axis of the preform neck, with upper channel 34 being spaced from flange 30.

Figure 5:
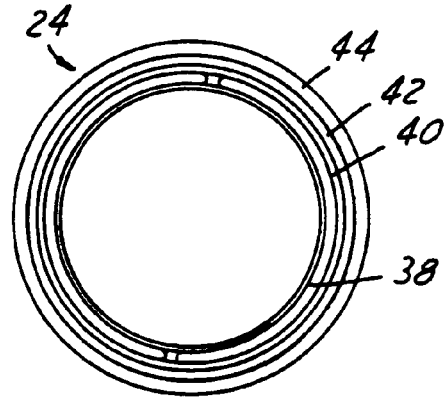
FIG. 5 is a top plan view of the finish ring in FIG. 4.

Finish ring 24 is circumferentially continuous (FIG. 5). Finish ring 24 includes an annular cylindrical wall 38 having one or more external threads or thread segments 40. In the preferred embodiment of ring 24 illustrated in the drawings, a circumferential bead 42 extends around the outer surface of wall 38 beneath threads 40 for cooperating with a tamper-indicating mechanism on a closure secured to the finish of the final container. A capping flange 44 extends radially outwardly from the lower end of wall 38, giving finish ring 24 a generally L-shaped lateral cross section (FIG. 4) in the illustrated embodiments of the invention. Finish ring 24 is secured over the external surface of preform neck 28, covering channels 34, 36 in the embodiment of FIGS. 1–5.

Figure 6:
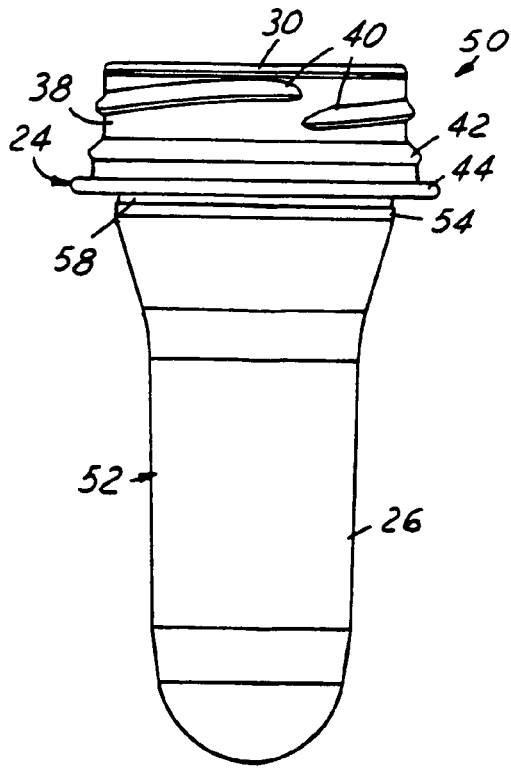
FIG. 6 is an elevational view of a preform assembly in accordance with a second embodiment of the invention.
Figure 7:
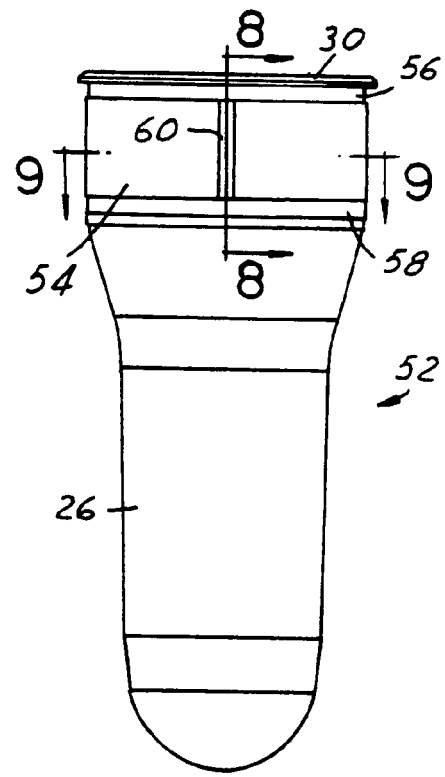
FIG. 7 is an elevational view of the preform in the assembly of FIG. 6.
Figure 8:
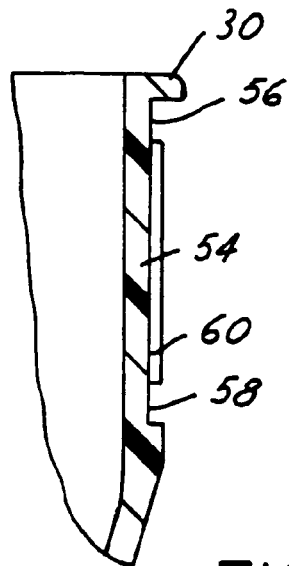
FIGS. 8 and 9 are sectional views taken substantially along the respective lines 8—8 and 9—9 in FIG. 7.
Figure 9:
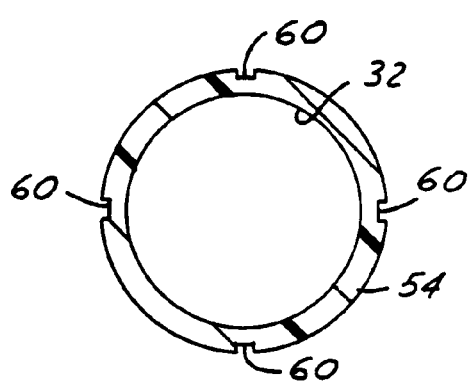

FIGS. 6–9 illustrate a preform assembly 50 in accordance with a second exemplary but presently preferred embodiment of the invention. Reference numerals in FIGS. 6–9 that are identical to those employed in FIGS. 1–5 indicate identical or similar components. Preform assembly 50 includes a preform 52 having a separate finish ring 24 externally secured thereto. Preform 52 includes body 26 having a cylindrical neck 54 molded integrally with body 26. A flange 30 extends radially outwardly from the upper end of neck 54 remote from body 26 and surrounding the preform mouth 32 (FIG. 9). A pair of external circumferential channels 56, 58 extend in spaced parallel planes around the outer surface of cylindrical neck 54, with channel 56 being adjacent to and immediately beneath flange 30 and channel 58 being adjacent to the juncture of neck 54 with body 26. At least one axial channel 60 extends along the outer surface of neck 54 interconnecting channels 56, 58. In the illustrated preferred embodiment of the invention, there are four axial channels 60 (FIG. 9) circumferentially spaced around the outer surface of neck 54 at 90° spacing from each other. When finish ring 24 is assembled to preform neck 54, lower channel 58 is wholly or partially uncovered, as best seen in FIG. 6. Channels 56, 58 assist in removing preform 52 from its forming mold, as with channels 34, 36 in the embodiment of FIGS. 1–5. Furthermore, circumferential channels 56, 58 cooperate with interconnecting axial channels 60 to provide for drainage of any liquid that may enter between the lower surface of flange 30 and the upper edge of finish ring 24 during filling of the final container.

Preforms 22, 52 may be of any suitable plastic construction, such as monolayer PET or multilayer construction of PET layers alternating with layers of barrier resin such as ethylene vinyl alcohol (EVOH) or nylon. Preforms 22, 52 may be injection molded or compression molded. Likewise, finish ring 24 may be of injection or compression molded plastic construction. By providing finish ring 24 separate from preforms 22, 52, the finish ring 24 may be of any desired material construction, either the same as or more preferably different from the material construction of the preform. For example, finish ring 24 can be of PET, post consumer resin (PCR), process regrind (REG), polypropylene (PP), polyethylene (PE) or polyethylene naphthalate (PEN) construction. Where finish ring 24 is of polyester construction (e.g., PET or PEN), the finish ring may be wholly or partially crystallized as molded. This may be accomplished by employing fast-crystallizing materials or suitably setting process conditions for manufacture of the finish ring, such as high mold temperature, slow mold cooling, heated areas in the mold cavity, etc. The finish ring alternatively may be wholly or partially crystallized in a post-molding operation. In other words, the material and conditions of fabrication of finish ring 24 may be selected separately from the material and manufacturing conditions of preforms 22, 52 to achieve desired operating characteristics at the finish area of the preform and the final container. Furthermore, the preforms can be molded with thin wall sections without having to accommodate flow of material into a thicker finish area, which reduces material cost and mold cycle time. Finish ring 24 is secured to the neck 28 of the preform 22 by interference fit (e.g., press fit or shrink fit), adhesive or welding. One presently preferred implementation of the invention involves interference press fit of finish ring 24 onto the neck of the preform. The preform neck and/or the finish ring can be provided with suitable means for preventing rotation of the ring on the neck.

There have thus been disclosed a preform assembly and a method of manufacture that fully satisfy all of the objects and aims previously set forth. The invention has been disclosed in conjunction with two exemplary presently preferred embodiments thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

What is claimed is:

1. A preform assembly for blow molding a container, which includes:
   a molded plastic preform having a body and a neck with an external surface, and having an open mouth at one end of said neck,
   first and second external circumferential channels molded into said neck external surface for removing said preform from a forming mold, wherein said first circumferential channel is adjacent to said mouth and said second circumferential channel is adjacent to said body, such that the space on said neck between said first and second circumferential channels has no additional circumferential channels, and wherein said neck has at least one external axial channel extending between said circumferential channels on said external surface of said neck; and
   a plastic finish ring molded separately from said preform and externally secured to said neck over said surface, and wherein said second circumferential channel is at least partially uncovered by said finish ring.

2. The preform assembly set form in claim 1 wherein said preform has an external flange surrounding said mouth, said first circumferential channel being adjacent to said flange.

3. The preform assembly set forth in claim 1 wherein said finish ring has at least one external thread and an external capping flange at one axial end of said ring.

4. The preform assembly set forth in claim 1 wherein said finish ring is externally secured to said neck by interference fit, adhesive, or welding.

5. The preform assembly set forth in claim 1 wherein said plastic finish ring is of different material construction from said plastic preform.

6. The preform assembly set forth in claim 1 wherein said plastic finish ring is of material construction selected from the group consisting of: PET, PP, PE, PEN, REG, PCR, and wholly or partially crystallized polyester.

\* \* \* \* \*